(12) United States Patent
Kim et al.

(10) Patent No.: US 12,738,193 B2
(45) Date of Patent: Sep. 15, 2026

(54) POWER SUPPLY HAVING REFERENCE AND COMPENSATION VOLTAGES AND DISPLAY APPARATUS INCLUDING THE SAME

(71) Applicant: LG Display Co., Ltd., Seoul (KR)

(72) Inventors: Jung Jae Kim, Paju-si (KR); Dong Won Park, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/924,718

(22) Filed: Oct. 23, 2024

(65) Prior Publication Data

US 2025/0157384 A1 May 15, 2025

(30) Foreign Application Priority Data

Nov. 9, 2023 (KR) ........................ 10-2023-0154579

(51) Int. Cl.
*G09G 3/20* (2006.01)
*H02M 3/158* (2006.01)

(52) U.S. Cl.
CPC ....... *G09G 3/2092* (2013.01); *G09G 2310/08* (2013.01); *G09G 2320/0257* (2013.01); *G09G 2330/021* (2013.01); *H02M 3/158* (2013.01)

(58) Field of Classification Search
CPC .................................................... G09G 3/2092
See application file for complete search history.

(56) References Cited

U.S. PATENT DOCUMENTS

2015/0130690 A1* 5/2015 Kim ..................... G09G 3/3233 315/307
2015/0221271 A1* 8/2015 Hwang ................ G09G 3/3655 345/212
2019/0206357 A1* 7/2019 Ahn ..................... G09G 3/3266
2020/0105185 A1* 4/2020 Chen ......................... F21S 4/20

* cited by examiner

*Primary Examiner* — William Boddie
*Assistant Examiner* — Andrew B Schnirel
(74) *Attorney, Agent, or Firm* — Birch, Stewart, Kolasch & Birch, LLP

(57) ABSTRACT

A display apparatus includes a display panel configured to display an image, a timing controller configured to control the display panel, and a power supply including an output circuit configured to generate an output power for supplying power to the display panel based on an input power, and an output controller configured to sense a voltage output through an output terminal of the output circuit to obtain a sensing value. The output controller provides a reference voltage value and compensation voltage values having levels which differ from a level of the reference voltage value, based on an external signal. Further, the output controller selectively outputs at least one of the reference voltage value and the compensation voltage values to provide a voltage value, based on the external signal, and generates a control signal for controlling the output circuit, based on the sensing value and the voltage value.

19 Claims, 22 Drawing Sheets

[MEDIUM-GRAYSCALE STILL IMAGE]

POWER SUPPLY HAVING REFERENCE AND COMPENSATION VOLTAGES AND DISPLAY APPARATUS INCLUDING THE SAME

CROSS-REFERENCE TO RELATED APPLICATIONS

This application claims priority to Korean Patent Application No. 10-2023-0154579 filed in the Republic of Korea on Nov. 9, 2023, the entire contents of which is hereby expressly incorporated by reference into the present application.

BACKGROUND

Field of the Invention

The present disclosure relates to a power supply and a display apparatus including the same.

Discussion of the Related Art

As information technology advances, the market for display apparatuses which function as connection mediums for connecting users to information is growing. Therefore, the use of display apparatuses such as light emitting display apparatuses, quantum dot display (QDD) apparatuses, and liquid crystal display (LCD) apparatuses is increasing.

The display apparatuses described above include a display panel having a plurality of subpixels, a driver for outputting a driving signal for driving the display panel, and a power supply for generating power to be supplied to the display panel or the driver.

In such display apparatuses, when the driving signal (for example, a scan signal and a data signal) is supplied to each of the subpixels provided in the display panel, a selected subpixel can transmit light or can self-emit light, and thus, an image can be displayed.

SUMMARY OF THE DISCLOSURE

To overcome the aforementioned and other problems of the related art, the present disclosure can provide a power supply and a display apparatus including the same, which can remove or decrease (improve) output voltage ripples caused by the occurrence of a load transient condition in driving of a display panel in order to prevent (minimize) a possibility of a motion afterimage, thereby enhancing the display quality of a moving image.

To achieve these objects and other advantages and in accordance with the purpose of the disclosure, as embodied and broadly described herein, a display apparatus includes a display panel configured to display an image, a timing controller configured to control the display panel, and a power supply including an output circuit configured to generate an output power for supplying power to the display panel, based on an input power, and an output controller configured to sense a voltage output through an output terminal of the output circuit to obtain a sensing value, wherein the output controller provides a reference voltage value and compensation voltage values having levels which differ from a level of the reference voltage value, based on an external signal, selectively outputs at least one of the reference voltage value and the compensation voltage values to provide a voltage value, based on the external signal, and generates a control signal for controlling the output circuit, based on the sensing value and the voltage value.

According to one or more aspects of the present disclosure, the output controller can offset an output voltage ripple appearing in an output terminal thereof when an output current is generated from the output circuit, based on the compensation voltage values.

According to one or more aspects of the present disclosure, the output controller can include a reference voltage setting circuit configured to output the reference voltage value, based on voltage setting data included in the external signal and a first compensation voltage setting circuit and a second compensation voltage setting circuit configured to respectively output a first compensation voltage value and a second compensation voltage value, based on current setting data included in the external signal.

According to one or more aspects of the present disclosure, the reference voltage value, the first compensation voltage value, and the second compensation voltage value can have a following relationship: the second compensation voltage value<the reference voltage value<the first compensation voltage value.

According to one or more aspects of the present disclosure, the reference voltage setting circuit can output the reference voltage value having a level which increases as a voltage setting data value included in the voltage setting data increases, the first compensation voltage setting circuit can output the first compensation voltage value having a level which increases as a current setting data value included in the current setting data increases, and the second compensation voltage setting circuit can output the second compensation voltage value having a level which decreases as a current setting data value included in the current setting data increases.

According to one or more aspects of the present disclosure, the output controller can include a selection circuit configured to selectively output one of the reference voltage value, the first compensation voltage value, and the second compensation voltage value, based on a logic state of each of a global shutter on signal and a global shutter off signal included in the external signal.

According to one or more aspects of the present disclosure, the first compensation voltage value and the second compensation voltage value can have a reverse phase relationship.

According to one or more aspects of the present disclosure, the selection circuit can output the reference voltage value during a first period where a load transient caused by driving of the display panel does not occur, output the first compensation voltage value during a second period where a load transient caused by driving of the display panel starts, output the reference voltage value during a third period where driving of the display panel is maintained, and output the second compensation voltage value during a fourth period where a load transient caused by driving of the display panel ends.

In another aspect of the present disclosure, a power supply includes an output circuit configured to generate an output power, based on an input power and an output controller configured to sense a voltage output through an output terminal of the output circuit to obtain a sensing value, wherein the output controller provides a reference voltage value and compensation voltage values having levels which differ from a level of the reference voltage value, based on an external signal, selectively outputs at least one of the reference voltage value and the compensation voltage values to provide a voltage value, based on the external signal, and generates a control signal for controlling the output circuit, based on the sensing value and the voltage value.

According to one or more aspects of the present disclosure, the output controller can include a reference voltage setting circuit configured to output the reference voltage value, based on voltage setting data included in the external signal and a first compensation voltage setting circuit and a second compensation voltage setting circuit configured to respectively output a first compensation voltage value and a second compensation voltage value, based on current setting data included in the external signal, and the reference voltage value, the first compensation voltage value, and the second compensation voltage value can have a following relationship: the second compensation voltage value<the reference voltage value<the first compensation voltage value.

According to one or more aspects of the present disclosure, the reference voltage setting circuit can output the reference voltage value having a level which increases as a voltage setting data value included in the voltage setting data increases, the first compensation voltage setting circuit can output the first compensation voltage value having a level which increases as a current setting data value included in the current setting data increases, and the second compensation voltage setting circuit can output the second compensation voltage value having a level which decreases as a current setting data value included in the current setting data increases.

According to one or more aspects of the present disclosure, the output controller can include a selection circuit configured to selectively output one of the reference voltage value, the first compensation voltage value, and the second compensation voltage value, based on a logic state of each of an on signal and an off signal included in the external signal.

According to one or more aspects of the present disclosure, the selection circuit can output the reference voltage value during a first period where an output current is not generated from the output circuit, output the first compensation voltage value during a second period where the output current starts to generate, output the reference voltage value during a third period where the output current is maintained, and output the second compensation voltage value during a fourth period where the generating of the output current ends.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE EMBODIMENTS

Hereinafter, the present disclosure will be described more fully with reference to the accompanying drawings, in which example embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art. Further, the term "can" fully encompass all the meanings and coverages of the term "may."

A display apparatus according to the present disclosure can be applied to televisions (TVs), video players, personal computers (PCs), home theaters, electronic devices for vehicles, and smartphones, but is not limited thereto. The display apparatus according to the present disclosure can be implemented as a light emitting display apparatus, a quantum dot display (QDD) apparatus, or a liquid crystal display (LCD) apparatus. Hereinafter, for convenience of description, a light emitting display apparatus self-emitting light by using an inorganic light emitting diode or an organic light emitting diode will be described for example. Further, all the components of each display apparatus and each power supply according to all embodiments of the present disclosure are operatively coupled and configured.

Figure 1:
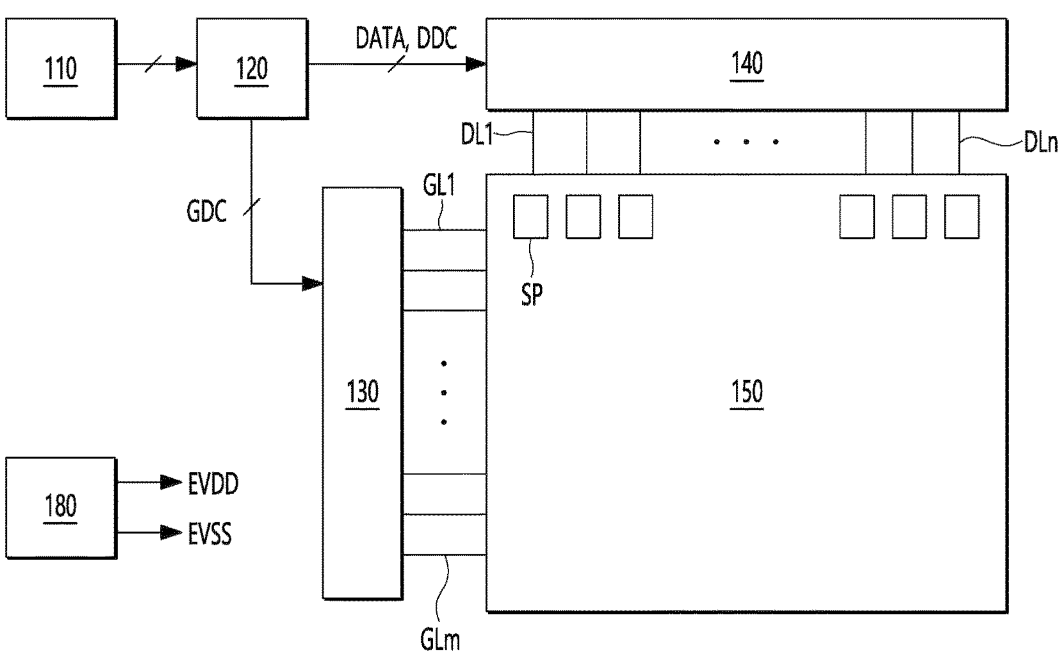
FIG. 1 is a block diagram schematically illustrating a light emitting display apparatus.
Figure 2:
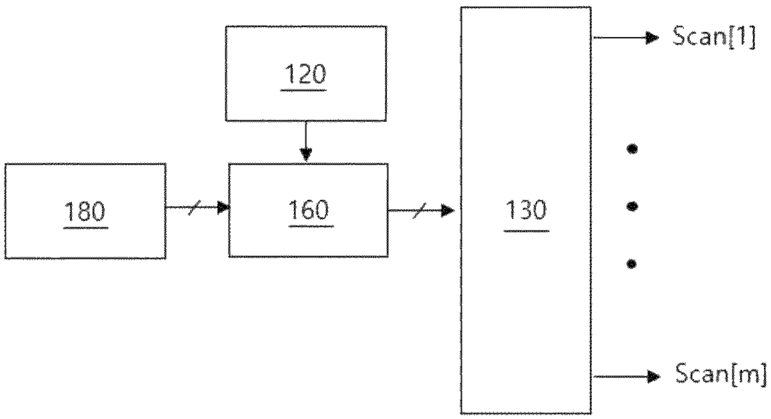
FIGS. 2 and 3 are diagrams for describing a configuration of a scan driver of a gate in panel (GIP) type.
Figure 3:
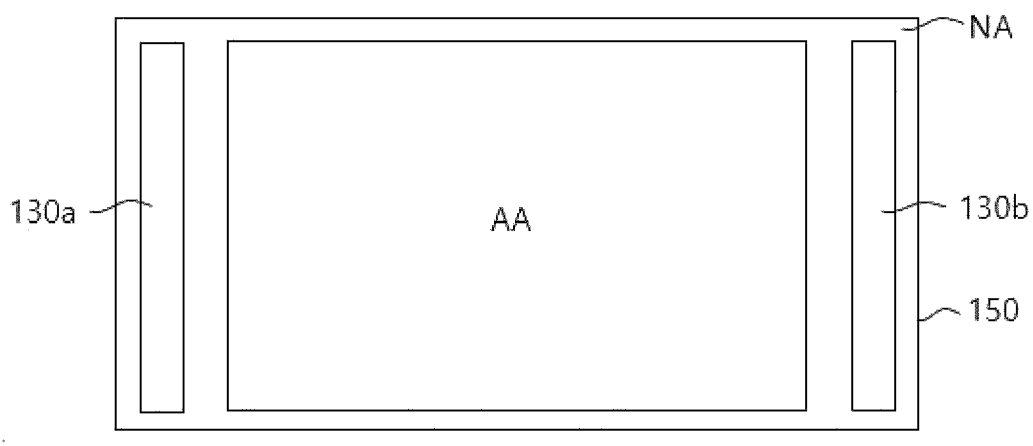
Figure 4:
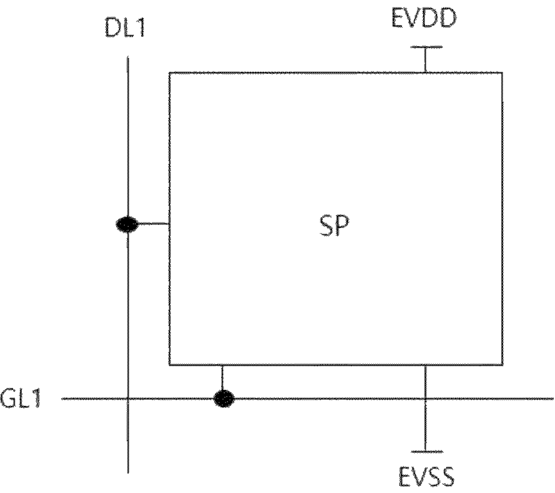
FIG. 4 is an example diagram of a subpixel.

FIG. 1 is a block diagram schematically illustrating a light emitting display apparatus according to an embodiment of the present disclosure, FIGS. 2 and 3 are diagrams for describing a configuration of a scan driver of a gate in panel (GIP) type according to an embodiment of the present disclosure, and FIG. 4 is an example diagram of a subpixel according to an embodiment of the present disclosure.

Referring to FIGS. 1 to 4, a light emitting display apparatus according to the embodiment of the present disclosure can include a video supply unit 110, a timing controller 120, a scan driver 130, a data driver 140, a display panel 150, and a power supply 180.

The video supply unit 110 (a set or a host system) can output a video data signal supplied from the outside or various driving signals and an image data signal stored in an internal memory thereof. The video supply unit 110 can supply a data signal and the various driving signals to the timing controller 120.

The timing controller 120 can output a gate timing control signal GDC for controlling an operation timing of the scan driver 130, a data timing control signal DDC for controlling an operation timing of the data driver 140, and various synchronization signals (a vertical synchronization signal Vsync and a horizontal synchronization signal Hsync). The timing controller 120 can provide the data driver 140 with the data timing control signal DDC and a data signal DATA supplied from the video supply unit 110. The timing controller 120 can be implemented as an integrated circuit (IC) type and can be mounted on a printed circuit board (PCB), but is not limited thereto.

The scan driver 130 can output a scan signal (or a scan voltage) in response to the gate timing control signal GDC supplied from the timing controller 120. The scan driver 130 can supply the scan signal to a plurality of subpixels, included in the display panel 150, through a plurality of gate lines GL1 to GLm, where m is a real number such as a positive integer. The scan driver 130 can be implemented as an IC type or can be directly provided on the display panel 150 in a GIP type, but is not limited thereto. Hereinafter, however, for convenience of description, a GIP-type scan driver as in FIGS. 2 and 3 will be described for example.

Referring to FIGS. 2 and 3, a GIP-type scan driver 130 can include shift registers 130*a* and 130*b* which are formed as a GIP type at one side and the other side of a non-display area NA of the display panel 150. The shift registers 130*a* and 130*b* can be formed as a thin film type in the non-display area NA of the display panel 150, based on the GIP type. The GIP-type scan driver 130 can output scan signals Scan[1] to Scan[m] for turning on or off transistors provided in a display area AA of the display panel 150.

The GIP-type scan driver 130 can operate based on voltages and signals output from the timing controller 120, the power supply 180, and the level shifter 160. The level shifter 160 can generate signals needed for driving of the GIP-type scan driver 130 (130*a* and 130*b*), based on voltages and signals output from the timing controller 120 and the power supply 180.

In response to the data timing control signal DDC supplied from the timing controller 120, the data driver 140 can sample and latch the data signal DATA, convert a digital data signal into an analog data voltage, based on a gamma reference voltage, and output the analog data voltage. The data driver 140 can respectively supply data voltages to the subpixels of the display panel 150 through a plurality of data lines DL1 to DLn, where n is a real number such as a positive integer. The data driver 140 can be implemented as an IC type or can be mounted on the display panel 150 or a PCB, but is not limited thereto.

The power supply 180 can generate an output voltage including a high-level voltage and a low-level voltage, based on an input voltage supplied from the outside, and can output the high-level voltage and the low-level voltage through a high-level voltage line EVDD and a low-level voltage line EVSS each connected to the display panel 150. The power supply 180 can generate and output a voltage (for example, a gate high voltage and a gate low voltage) needed for driving of the scan driver 130 or a voltage (for example, a drain voltage and a half drain voltage) needed for driving of the data driver 140, in addition to the high-level voltage and the low-level voltage.

The display panel 150 can be manufactured based on a substrate, having stiffness or flexibility, such as glass, silicon, or polyimide. The display panel 150 can include a plurality of subpixels SP for displaying an image, based on the high-level voltage, the low-level voltage, and a driving signal including the scan signal and a data voltage. Referring to FIG. 4, the subpixel SP can be connected to a first data line DL1, a first gate line GL1, the high-level voltage line EVDD, and the low-level voltage line EVSS. The subpixel SP can self-emit light. The subpixel SP can emit light having one color of red, green, blue, and white.

Hereinabove, each of the timing controller 120, the scan driver 130, and the data driver 140 has been described as an individual element. However, based on an implementation type of the light emitting display apparatus, one or more of the timing controller 120, the scan driver 130, and the data driver 140 can be integrated into one IC.

The light emitting display apparatus described above can operate based on a normal driving mode which maintains an output of a current entirely applied to the display panel 150 and expresses an image and a global shutter driving mode which controls the turn-on/off of the output of the current entirely applied to the display panel 150 and expresses an image. Also, an output of the power supply 180 can be changed based on a characteristic of an image and a driving mode. This will be briefly described below.

Figure 5:
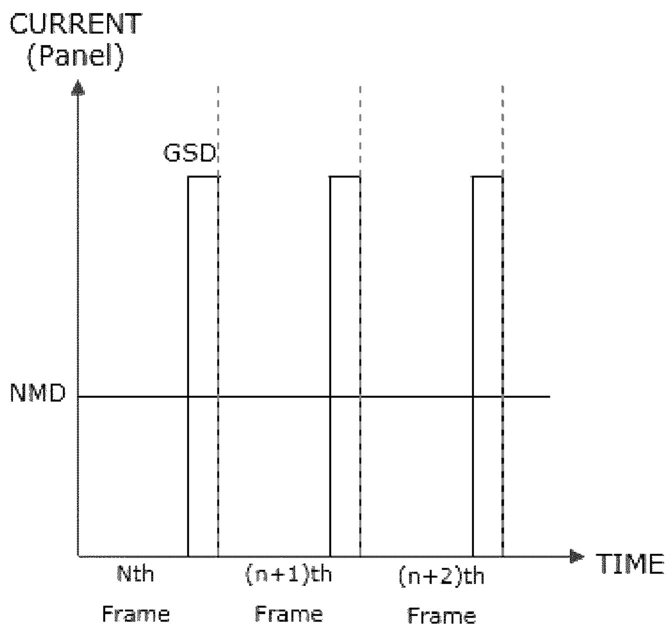
FIGS. 5 to 7 are diagrams for describing a variation of a current with respect to a driving mode when expressing a high-grayscale still image, a medium-grayscale still image, and a low-grayscale still image.
Figure 6:
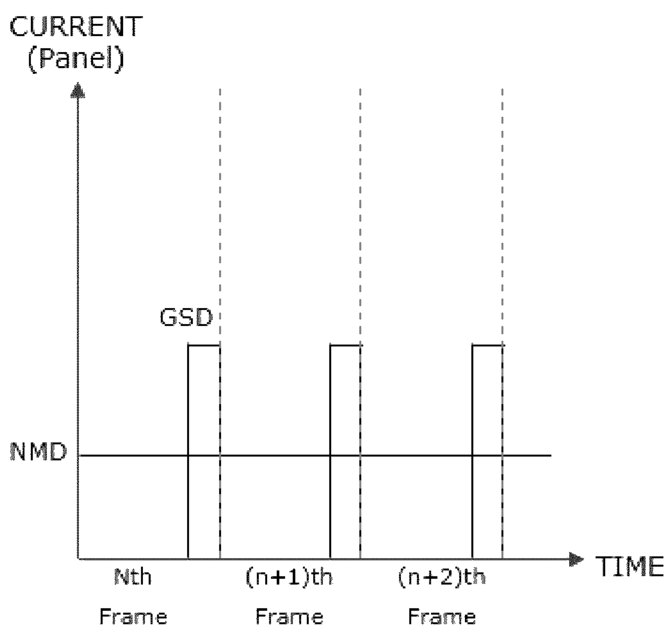
Figure 7:
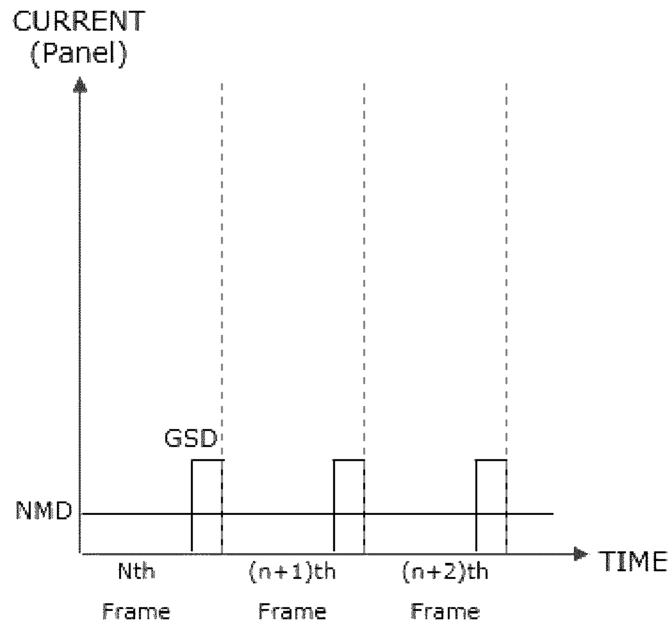
Figure 8:
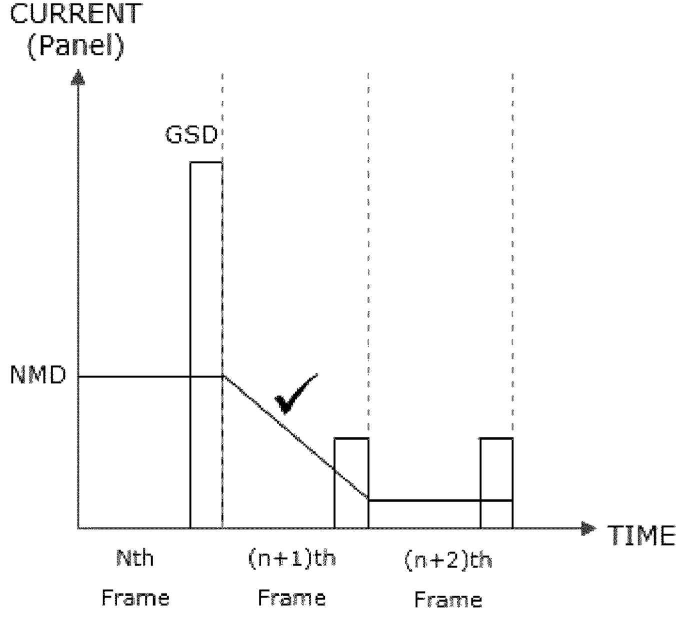
FIGS. 8 and 9 are diagrams for describing a variation of a current with respect to a driving mode when changing a gray level in a moving image.
Figure 9:
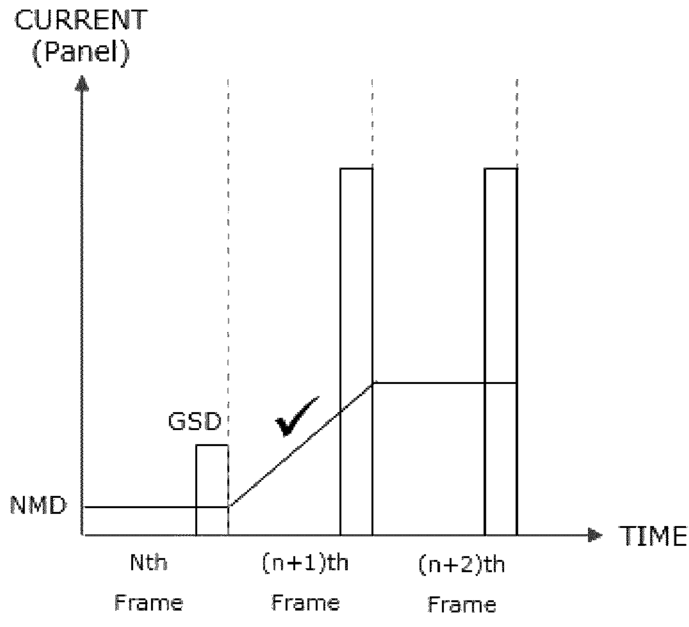

FIGS. 5 to 7 are diagrams for describing a variation of a current with respect to a driving mode when expressing a high-grayscale still image, a medium-grayscale still image, and a low-grayscale still image, and FIGS. 8 and 9 are diagrams for describing a variation of a current with respect to a driving mode when changing a gray level in a moving image.

Referring to FIGS. 5 to 7, a display panel can express a still image which is divided into a high gray level, a medium gray level, and a low gray level, with respect to the intensity of a current applied to a device. In a case where the display panel is driven based on a normal driving mode NMD, it can be seen that an output of a current is maintained without being disconnected during a frame period ($N^{th}$ Frame to $(n+2)^{th}$ Frame). On the other hand, in a case where the display panel is driven based on a global shutter driving mode GSD, it can be seen that an output of a current is applied and is then disconnected in an on/off form as in a portion of the frame period ($N^{th}$ Frame to $(n+2)^{th}$ Frame).

Referring to FIGS. 8 and 9, in the normal driving mode NMD, in a case which expresses a moving image shifted from a high gray level to a low gray level or expresses a moving image shifted from a low gray level to a high gray level, as an output of a current is maintained, there can be a possibility of a motion afterimage where an undesired image is recognized by a variation of a current like an $N^{th}+1$ frame ($(n+1)^{th}$ Frame). On the other hand, in the global shutter driving mode GSD, in a case which expresses a moving image shifted from a high gray level to a low gray level or expresses a moving image shifted from a low gray level to a high gray level, an output of a current can immediately occur during an image expression period after an output of a current is disconnected during a grayscale conversion period, thereby preventing (minimizing) a possibility of a motion afterimage.

In an embodiment of the present disclosure described below, an output voltage ripple caused by the occurrence of a load transient condition can be removed or reduced (e.g., improved) in driving of the display panel, based on the global shutter driving mode GSD. However, an embodiment described below is not limited to a case where the display panel is driven based on the global shutter driving mode GSD and can be applied to various driving modes.

Figure 10:
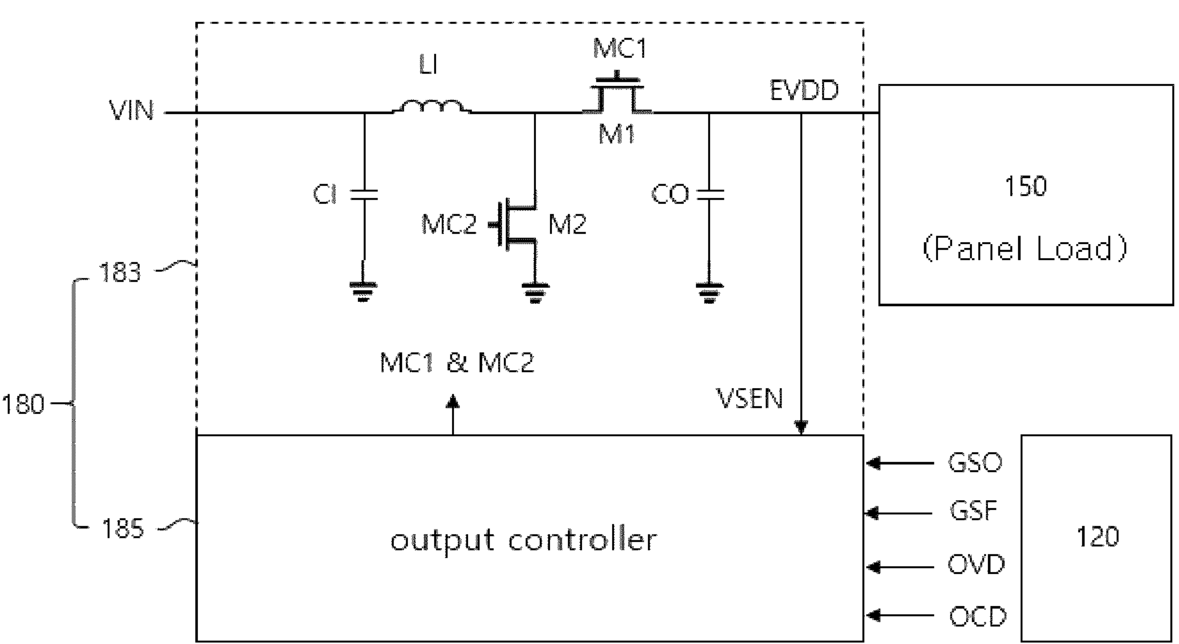
FIG. 10 is a block diagram schematically illustrating some elements of a light emitting display apparatus according to a first embodiment of the present disclosure.
Figure 11:
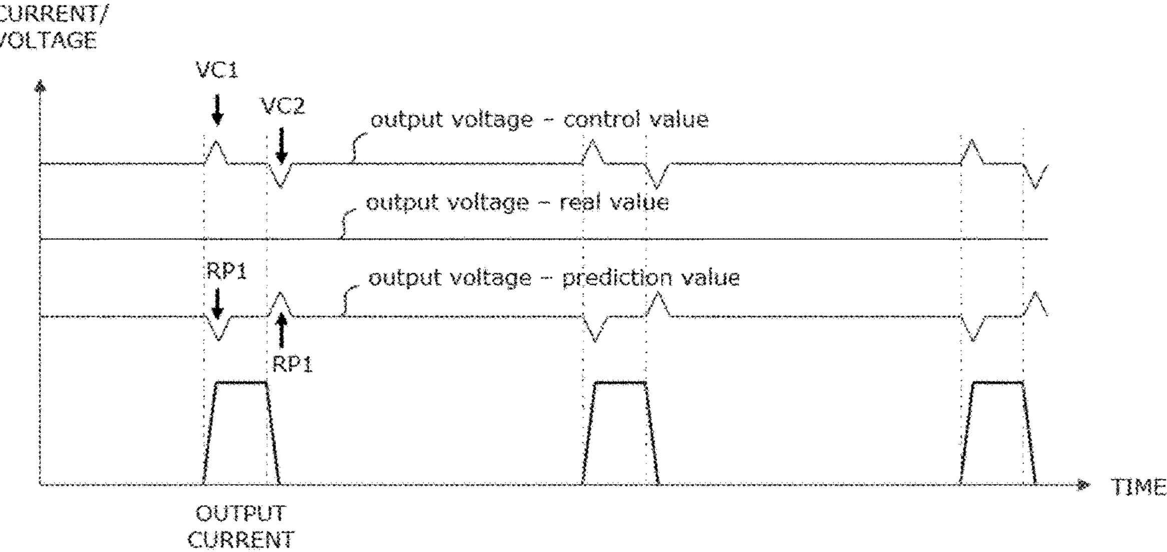
FIG. 11 is an output waveform diagram for describing an output control concept of a power supply according to the first embodiment.
Figure 12:
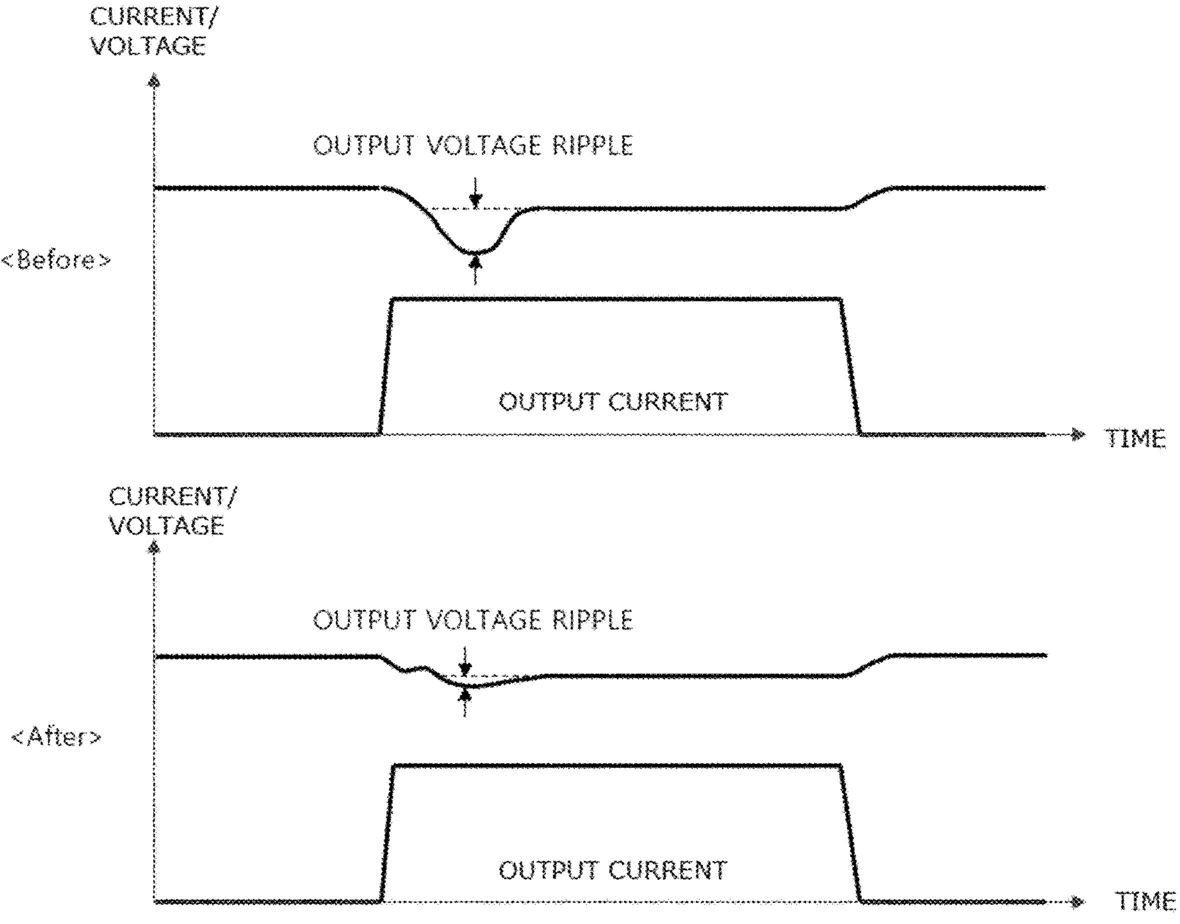
FIG. 12 is an output waveform diagram showing a difference between before and after the first embodiment is applied.

FIG. 10 is a block diagram schematically illustrating some elements of a light emitting display apparatus according to a first embodiment of the present disclosure, FIG. 11 is an output waveform diagram for describing an output control concept of a power supply according to the first embodiment, and FIG. 12 is an output waveform diagram showing a difference between before and after the first embodiment is applied.

Referring to FIG. 10, the light emitting display apparatus according to the first embodiment can include a display panel 150, a power supply 180, and a timing controller 120.

The timing controller 120 can output a global shutter on signal GSO, a global shutter off signal GSF, voltage setting data OVD, and current setting data OCD so as to control the power supply 180. Hereinafter, an example where a global shutter signal including the global shutter on signal GSO and the global shutter off signal GSF is output from the timing controller 120 with being divided into an on signal and an off signal will be described. However, the global shutter on signal GSO and the global shutter off signal GSF can be integrated into one global shutter signal and can be output as one signal.

The timing controller 120 can transfer the global shutter on signal GSO, the global shutter off signal GSF, the voltage setting data OVD, and the current setting data OCD, based on a communication interface connected to the power supply 180. For example, the communication interface connected between the timing controller 120 and the power supply 180 can be I2C, SPI, or S-Wire, but is not limited thereto.

The global shutter on signal GSO can be defined as a signal which activates an operation of a global shutter, and the global shutter off signal GSF can be defined as a signal which deactivates the operation of the global shutter. The global shutter on signal GSO and the global shutter off signal GSF can be configured as a signal such as logic high or logic low, but are not limited thereto.

The voltage setting data OVD can be defined as a data signal for setting an output voltage of a circuit included in the power supply 180, and the current setting data OCD can be defined as a data signal for setting an output current of the circuit included in the power supply 180. The voltage setting data OVD and the current setting data OCD can be configured with a data bit of N (where N can be an integer of 1 or more) bits, but are not limited thereto.

The power supply 180 can generate a high-level voltage needed for driving of the display panel 150, based on an input power VIN applied from the outside. The high-level voltage output from the power supply 180 can be applied through a high-level voltage line EVDD connected to an output terminal thereof. The power supply 180 can include an output circuit unit 183 which generates the high-level voltage, based on the input power VIN, and an output controller 185 which controls an operation of the output circuit unit 183.

The output circuit unit 183 can include an input capacitor CI, an inductor LI, a first transistor M1, a second transistor M2, and an output capacitor CO. The input capacitor CI can be connected to an input terminal at one end thereof, and the other end thereof can be connected to a ground terminal. The inductor LI can be connected to the input terminal at one end thereof, and the other end can be connected to a first electrode of the first transistor M1. The first transistor M1 can include the first electrode connected to the other end of the inductor LI, a second electrode connected to the output terminal, and a gate electrode connected to a first control line MC1. The second transistor M2 can include a first electrode connected to the first electrode of the first transistor M1 and the other end of the inductor LI, a second electrode connected to a ground terminal, and a gate electrode connected to a second control line MC2. The output capacitor CO can be connected to the output terminal at one end thereof, and the other end thereof can be connected to the ground terminal.

The output controller 185 can sense the high-level voltage output through the output terminal of the output circuit unit 183 to obtain a sensing value VSEN and can generate a first control signal and a second control signal which are output through the first control line MC1 and the second control line MC2, so as to control the output circuit unit 183. The output controller 185 can vary a generating condition of the first control signal and the second control signal, based on an external signal such as the global shutter on signal GSO, the global shutter off signal GSF, the voltage setting data OVD, and the current setting data OCD supplied from the timing controller 120 and the sensing value VSEN.

Referring to FIGS. 10 and 11, the power supply 180 according to the first embodiment can provide compensation values VC1 and VC2 appearing in "output voltage-control value" so as to remove ripple values RP1 and RP2 appearing in "output voltage-prediction value", when generating an output current. The power supply 180 according to the first embodiment can compensate for the output voltage to provide "output voltage-real value", based on the compensation values VC1 and VC2 which are provided to correspond to an on period where an output current starts to generate and an off period where the generating of the output current ends.

Referring to FIG. 12, before the power supply 180 according to the first embodiment is applied, it can be seen that output voltage ripple is largely shown. On the other hand, after the power supply 180 according to the first embodiment is applied, it can be seen that improvement is made so that output voltage ripple is hardly shown.

Therefore, the power supply 180 according to the first embodiment can remove or decrease (improve) output voltage ripple by compensating for an output voltage, based on a load transient condition such as the occurrence of an output current based on data and a signal output from a timing controller.

Figure 13:
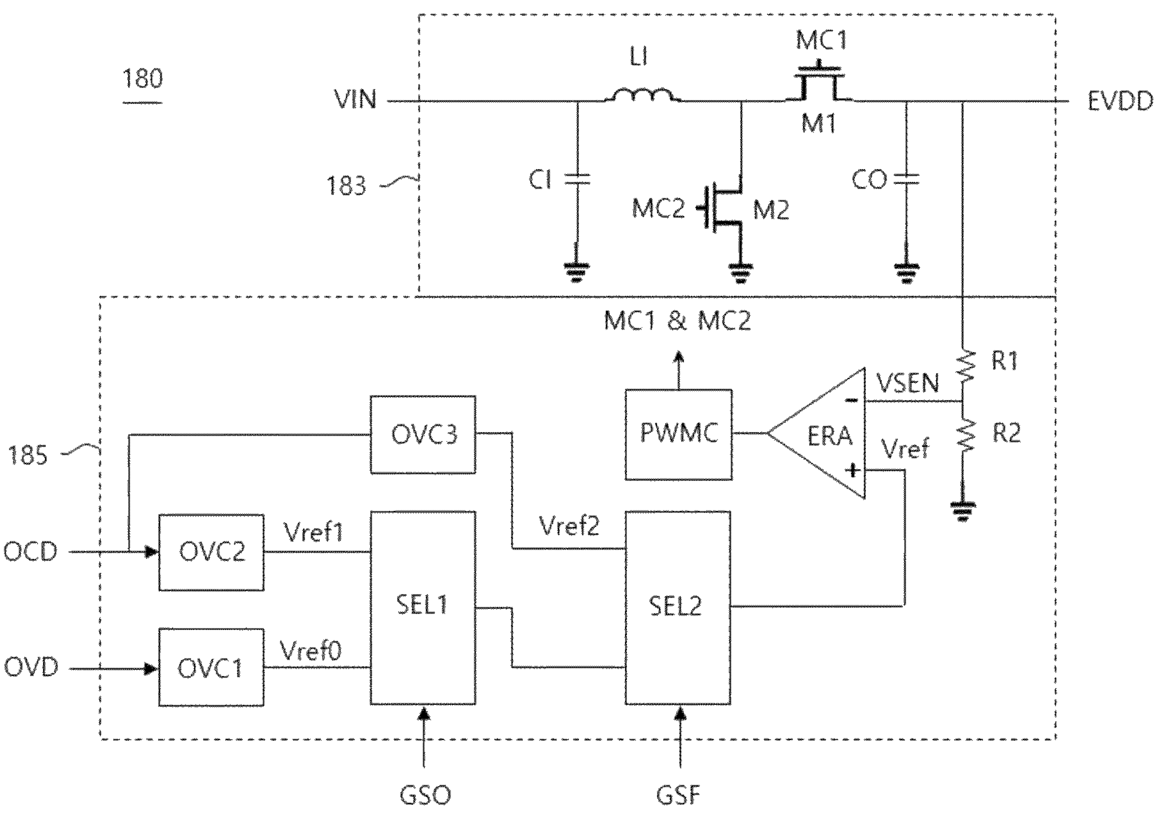
FIG. 13 is a block diagram illustrating in more detail a configuration of a power supply according to a second embodiment of the present disclosure.
Figure 14:
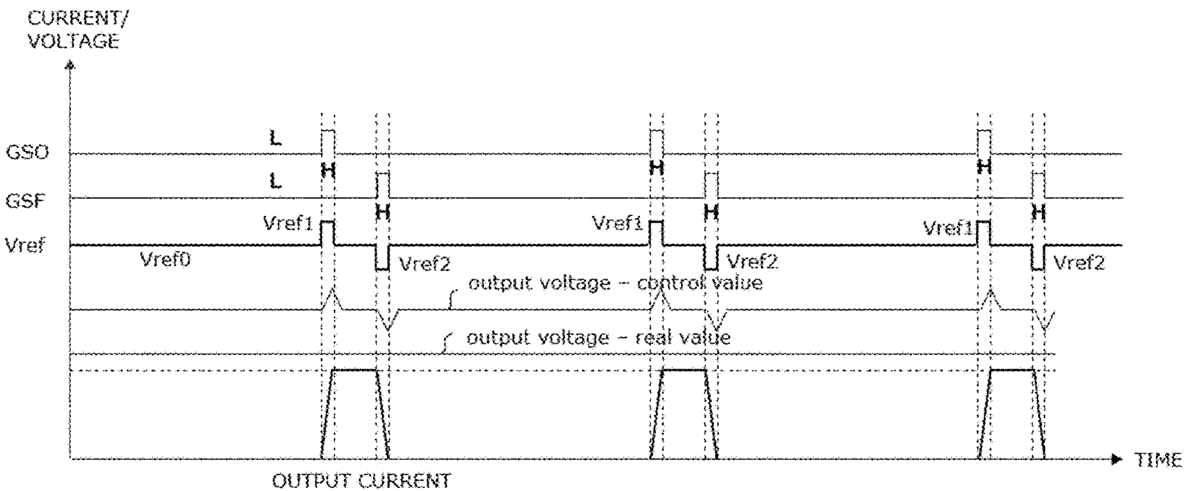
FIG. 14 is an output waveform diagram for describing an output control concept of the power supply according to the second embodiment.
Figure 15:
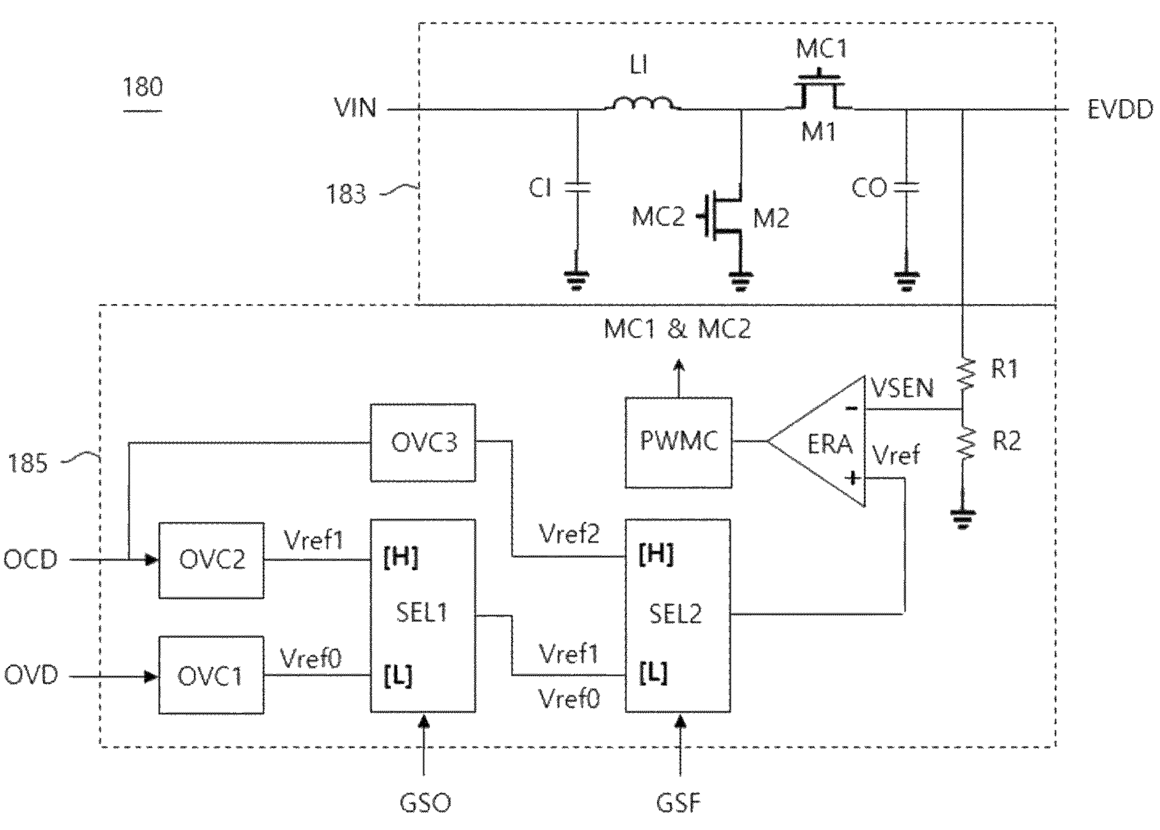
FIGS. 15 and 16 are diagrams for describing an operation of a partial period when performing an operation of the power supply according to the second embodiment.
Figure 16:
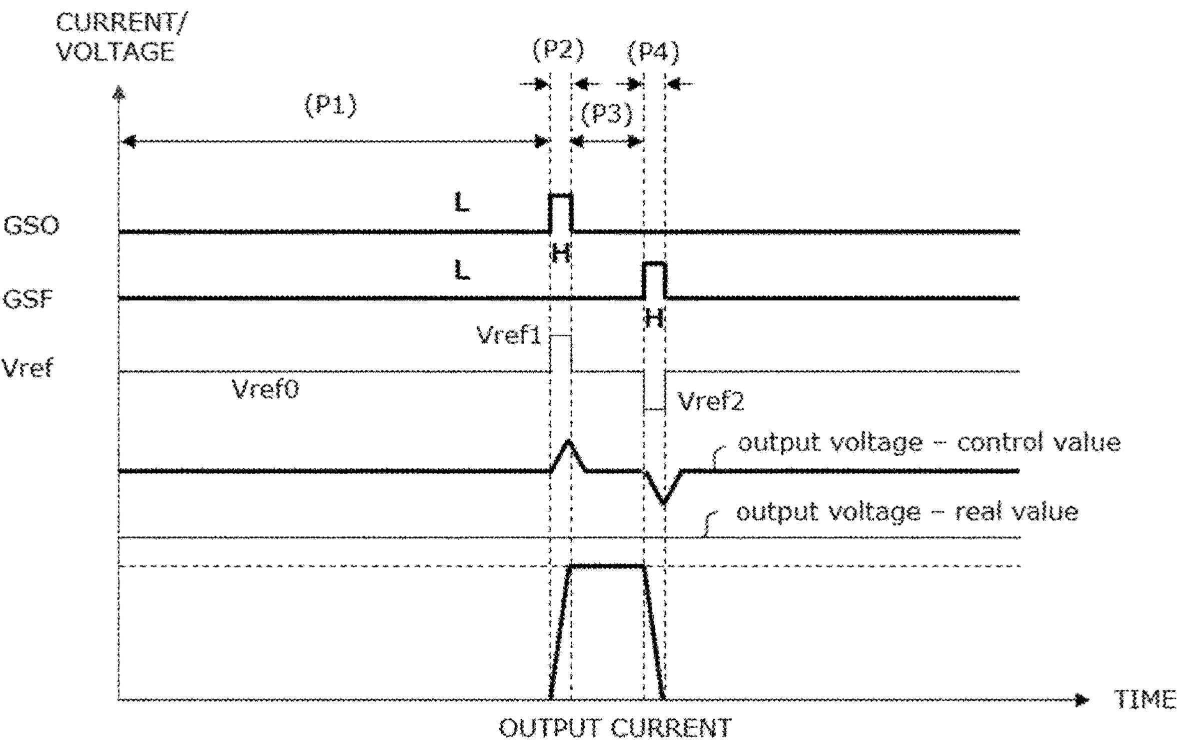
Figure 17:
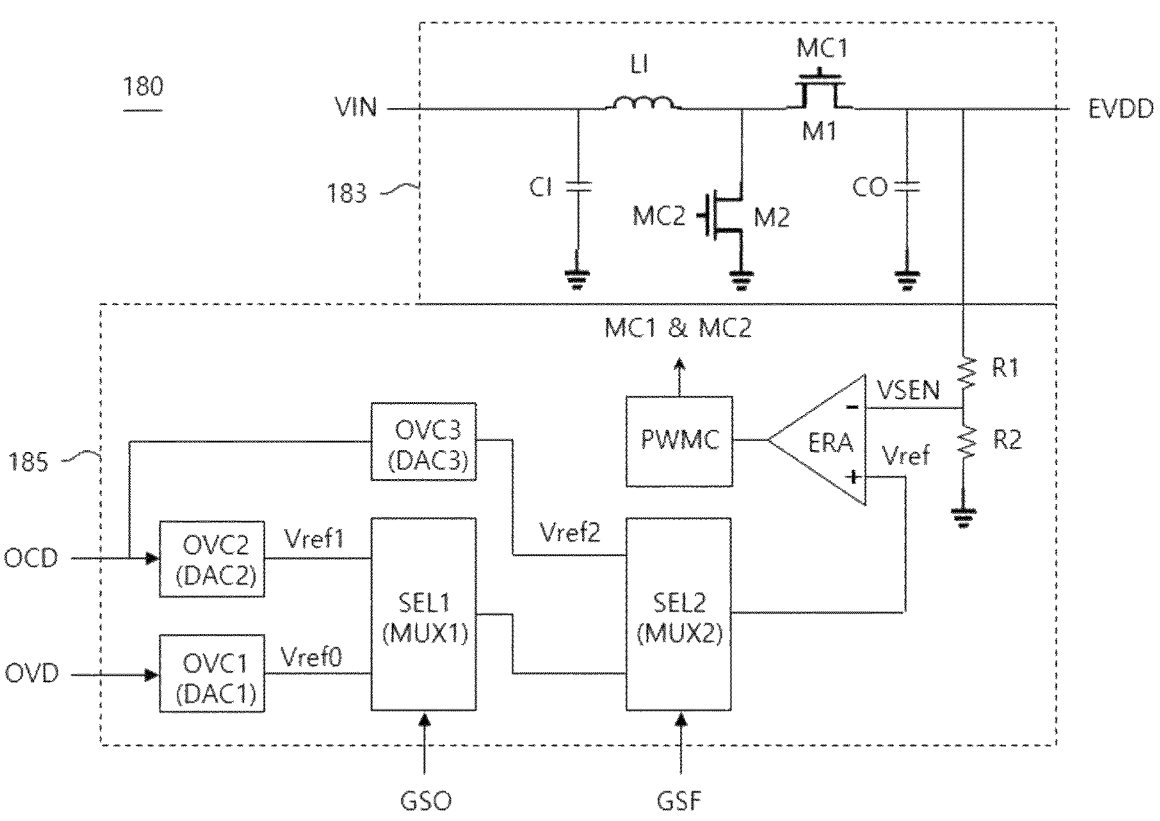
FIG. 17 is a block diagram illustrating an implementation example of a circuit illustrated in FIG. 14.

FIG. 13 is a block diagram illustrating in more detail a configuration of a power supply 180 according to a second embodiment of the present disclosure, FIG. 14 is an output waveform diagram for describing an output control concept of the power supply 180 according to the second embodiment, FIGS. 15 and 16 are diagrams for describing an operation of a partial period when performing an operation of the power supply 180 according to the second embodiment, and FIG. 17 is a block diagram illustrating an implementation example of a circuit illustrated in FIG. 14.

Referring to FIG. 13, the power supply 180 according to the second embodiment can include an output circuit unit 183 which generates a high-level voltage, based on an input power VIN, and an output controller 185 which controls an operation of the output circuit unit 183, as in the description of the first embodiment. The power supply 180 according to the second embodiment can have a difference with the first embodiment in configuration of the output controller 185, and thus, the difference will be described in more detail.

The output controller 185 can include a reference voltage setting circuit unit OVC1, a first compensation voltage setting circuit unit OVC2, a second compensation voltage setting circuit unit OVC3, a first selection circuit unit SEL1, a second selection circuit unit SEL2, a voltage sensing circuit unit ERA, R1, and R2, and a control signal generator PWMC.

The reference voltage setting circuit unit OVC1 can output a reference voltage value Vref0, based on voltage setting data OVD. A level of the reference voltage value Vref0 can vary based on the voltage setting data OVD. For example, the reference voltage setting circuit unit OVC1 can output the reference voltage value Vref0 having a level which increases as a voltage setting data value included in the voltage setting data OVD increases.

The first compensation voltage setting circuit unit OVC2 can output a first compensation voltage value Vref1, based on current setting data OCD. A level of the first compensation voltage value Vref1 can vary based on the current setting data OCD. For example, the first compensation voltage setting circuit unit OVC2 can output the first compensation voltage value Vref1 having a level which increases as a current setting data value included in the current setting data OCD increases.

The second compensation voltage setting circuit unit OVC3 can output a second compensation voltage value Vref2 having a reverse phase relationship with the first compensation voltage value Vref1, based on the current setting data OCD. A level of the second compensation voltage value Vref2 can vary based on the current setting data OCD. For example, the second compensation voltage setting circuit unit OVC3 can output the second compensation voltage value Vref2 having a level which decreases as the current setting data value included in the current setting data OCD increases.

Furthermore, in the second embodiment, for example, the first compensation voltage setting circuit unit OVC2 and the second compensation voltage setting circuit unit OVC3 can output the first compensation voltage value Vref1 and the second compensation voltage value Vref2 having a reverse phase relationship, based on the current setting data OCD.

However, according to a modification embodiment of the second embodiment, the first compensation voltage setting circuit unit OVC2 can be implemented to output the first compensation voltage value Vref1, based on the first current setting data, and the second compensation voltage setting circuit unit OVC3 can be implemented to output the second compensation voltage value Vref2, based on the second current setting data. In this case, the first compensation voltage value Vref1 and the second compensation voltage value Vref2 can be provided as a type which does not completely match therebetween, so that the first compensation voltage value Vref1 and the second compensation voltage value Vref2 have a reverse phase relationship but a voltage value of one thereof has a different level.

The first selection circuit unit SEL1 can output the reference voltage value Vref0 or can output the first compensation voltage value Vref1, in response to the global shutter on signal GSO. The first selection circuit unit SEL1 can supply one of the reference voltage value Vref0 and the first compensation voltage value Vref1 to the second selection circuit unit SEL2.

The second selection circuit unit SEL2 can output one of the reference voltage value Vref0 and the first compensation voltage value Vref1 supplied from the first selection circuit unit SEL1 or can output the second compensation voltage value Vref2, in response to the global shutter off signal GSF. The second selection circuit unit SEL2 can supply one of the reference voltage value Vref0, the first compensation voltage value Vref1, and the second compensation voltage value Vref2 to the voltage sensing circuit unit ERA, R1, and R2.

The voltage sensing circuit unit ERA, R1, and R2 can sense the high-level voltage output from the output terminal of the output circuit unit 183 to obtain the sensing value VSEN. The voltage sensing circuit unit ERA, R1, and R2 can output a signal for controlling the control signal generator PWMC, based on the sensing value VSEN and a voltage value Vref output from the second selection circuit unit SEL2.

The voltage sensing circuit unit ERA, R1, and R2 can include an error amplifier ERA, a first resistor R1, and a second resistor R2. The first resistor R1 can be connected to the output terminal of the output circuit unit 183 at one end thereof, and the other end thereof can be connected to an inverting terminal (−) of the error amplifier ERA and one end of the second resistor R2. The second resistor R2 can be connected to the inverting terminal (−) of the error amplifier ERA and the other end of the first resistor R1 at the one end thereof, and the other end thereof can be connected to a ground terminal. The inverting terminal (−) of the error amplifier ERA can be connected to a node connected to the first resistor R1 and the second resistor R2, and a noninverting terminal (+) thereof can be connected to an output terminal of the second selection circuit unit SEL2.

The control signal generator PWMC can generate a first control signal and a second control signal for controlling the first transistor M1 and the second transistor M2 included in the output circuit unit 183, based on a signal output from the error amplifier ERA. The first control signal and the second control signal can be generated as a pulse width modulation (PWM) signal. The control signal generator PWMC can vary a generating condition of the first control signal and the second control signal generated by the control signal generator PWMC can be output through the first control line MC1 and the second control line MC2.

Furthermore, the power supply 180 according to the second embodiment can generate a high output which increases as a level of the voltage value Vref increases, as in a relationship of second compensation voltage value Vref2<reference voltage value Vref0<first compensation voltage value Vref1. Here, a level ratio of second compensation voltage value Vref2<reference voltage value Vref0<first compensation voltage value Vref1 can be adjusted based on a driving condition (situation).

Referring to FIGS. 13 and 14, in the power supply 180 according to the second embodiment, the voltage value Vref applied to the noninverting terminal (+) of the error amplifier ERA can be changed based on a period where an output current is not generated, an on period where the output current starts to generate, and an off period where the generating of the output current ends. This will be described below.

When the global shutter on signal GSO and the global shutter off signal GSF are in a logic low L state, the reference voltage value Vref0 can be applied to the noninverting terminal (+) of the error amplifier ERA. When the global shutter on signal GSO is in a logic high H state and the global shutter off signal GSF is in a logic low L state, the first compensation voltage value Vref1 can be applied to the noninverting terminal (+) of the error amplifier ERA. When the global shutter on signal GSO is in a logic low L state and the global shutter off signal GSF is in a logic high H state, the second compensation voltage value Vref2 can be applied to the noninverting terminal (+) of the error amplifier ERA. Accordingly, the voltage value Vref applied to the noninverting terminal (+) of the error amplifier ERA can be changed based on a logic state of each of the global shutter on signal GSO and the global shutter off signal GSF.

Referring to FIGS. 15 and 16, when the global shutter on signal GSO is applied in a logic low L state, the first selection circuit unit SEL1 can output the reference voltage value Vref0, and when the global shutter on signal GSO is applied in a logic high H state, the first selection circuit unit SEL1 can output the first compensation voltage value Vref1. When the global shutter off signal GSF is applied in a logic low L state, the second selection circuit unit SEL2 can output the reference voltage value Vref0 or the first compensation voltage value Vref1, and when the global shutter off signal GSF is applied in a logic high H state, the first selection circuit unit SEL1 can output the second compensation voltage value Vref2.

Referring to FIG. 16, a first period P1 can be defined as a period (or a load transient nonoccurrence period) where an output current is not generated. In the first period P1, an output voltage of the power supply can be set to an original value.

A second period P2 can be defined as an on period (or an output current rising period based on load transient occurrence start) where the output current starts to generate. In the second period P2, the output voltage of the power supply can be set to be higher than the original value.

A third period P3 can be defined as a maintenance period (or a load transient occurrence/maintenance period) of the output current. In the third period P3, the output voltage of the power supply can be set to the original value.

A fourth period P4 can be defined as an off period (or an output current falling period based on load transient occurrence end) where the generating of the output current ends. In the fourth period P4, the output voltage of the power supply can be set to be lower than the original value.

Furthermore, a time ratio of the first period P1, the second period P2, the third period P3, and the fourth period P4 can be adjusted based on a driving condition (situation).

Referring to FIGS. 13 to 16, the power supply 180 according to the second embodiment can output the first compensation voltage value Vref1 and the second compensation voltage value Vref2 for offsetting output voltage ripple as in "output voltage-control value", when generating an output current. As a result, the power supply 180 according to the second embodiment can generate an output voltage which is improved so that output voltage ripple is hardly seen, as in "output voltage-real value".

Referring to FIG. 17, according to the second embodiment, the reference voltage setting circuit unit OVC1, the first compensation voltage setting circuit unit OVC2, and the second compensation voltage setting circuit unit OVC3 can respectively include a first digital-to-analog converter DAC1, a second digital-to-analog converter DAC2, and a third digital-to-analog converter DAC3. Also, the first selection circuit unit SEL1 and the second selection circuit unit SEL2 can respectively include a first multiplexer MUX1 and a second multiplexer MUX2 each having the form of 2:1. However, FIG. 17 can be merely one embodiment, but the present disclosure is not limited thereto.

Figure 18:
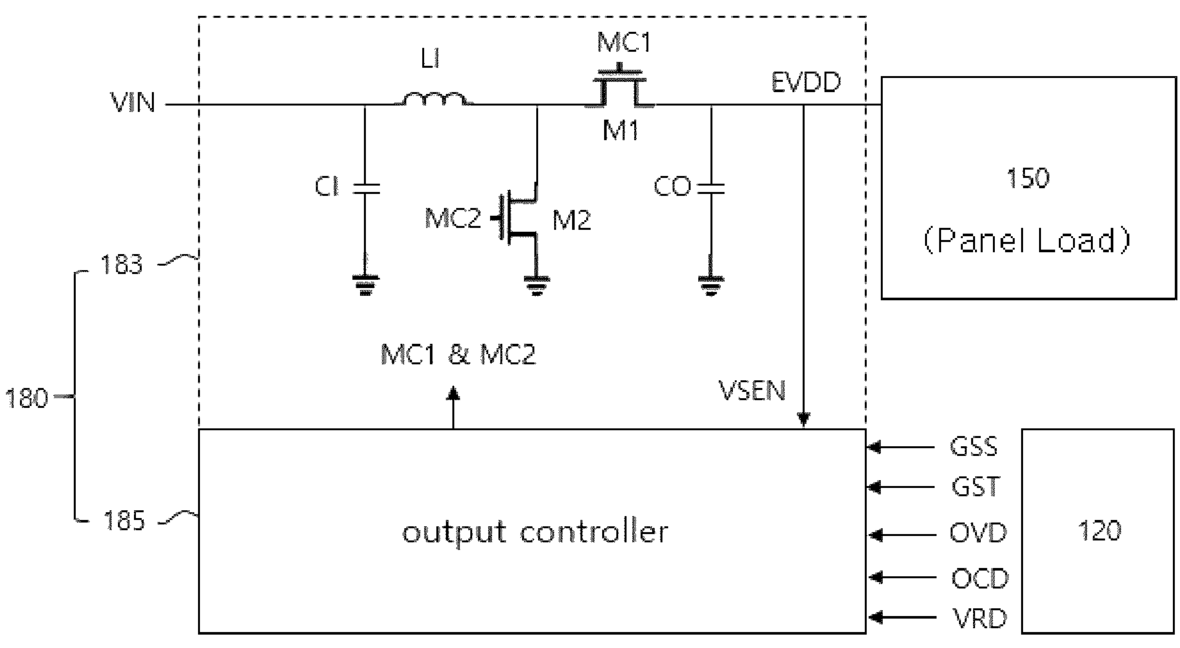
FIG. 18 is a block diagram schematically illustrating some elements of a light emitting display apparatus according to a third embodiment of the present disclosure.
Figure 19:
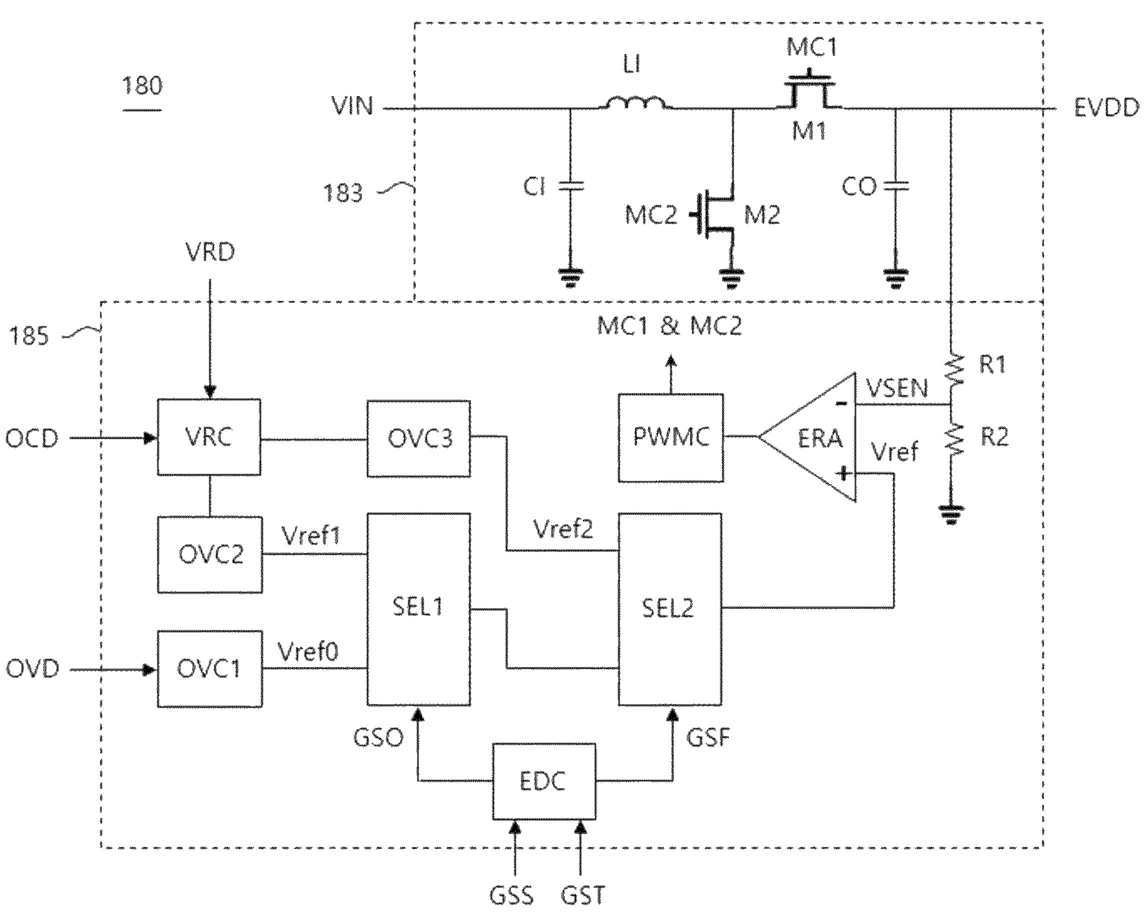
FIG. 19 is a block diagram illustrating in more detail a configuration of a power supply according to the third embodiment.
Figure 20:
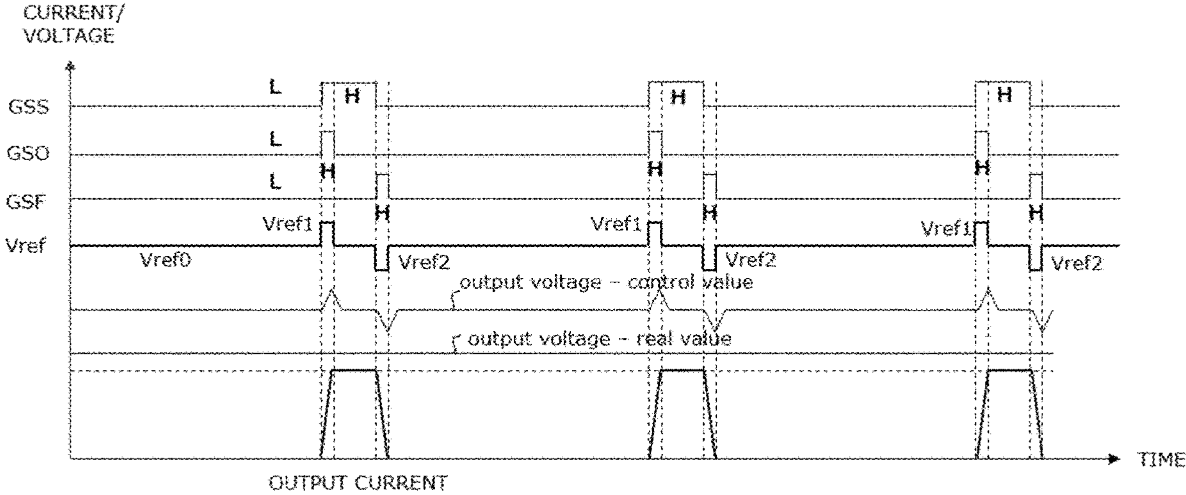
FIG. 20 is an output waveform diagram for describing an output control concept of the power supply according to the third embodiment.
Figure 21:
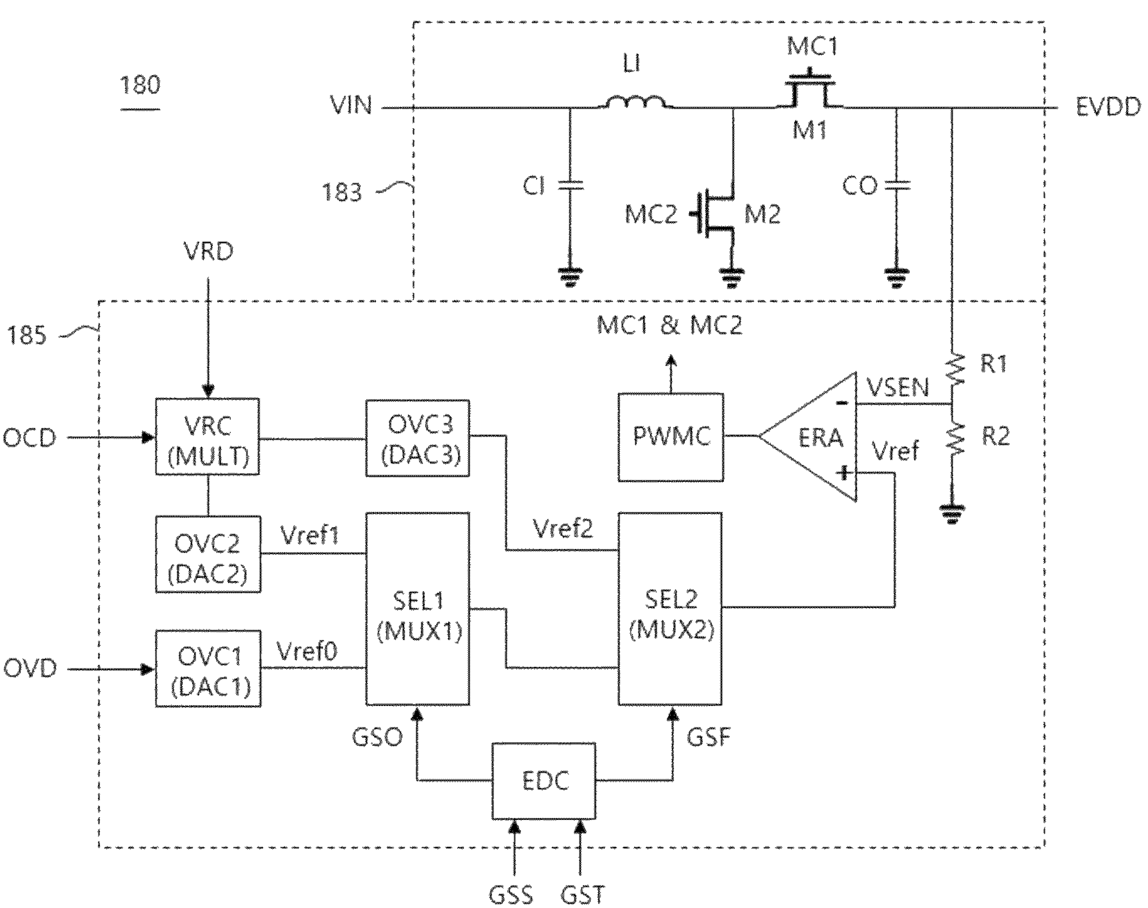
FIGS. 21 and 22 are diagrams for describing an operation of a partial period when performing an operation of the power supply according to the third embodiment.
Figure 22:
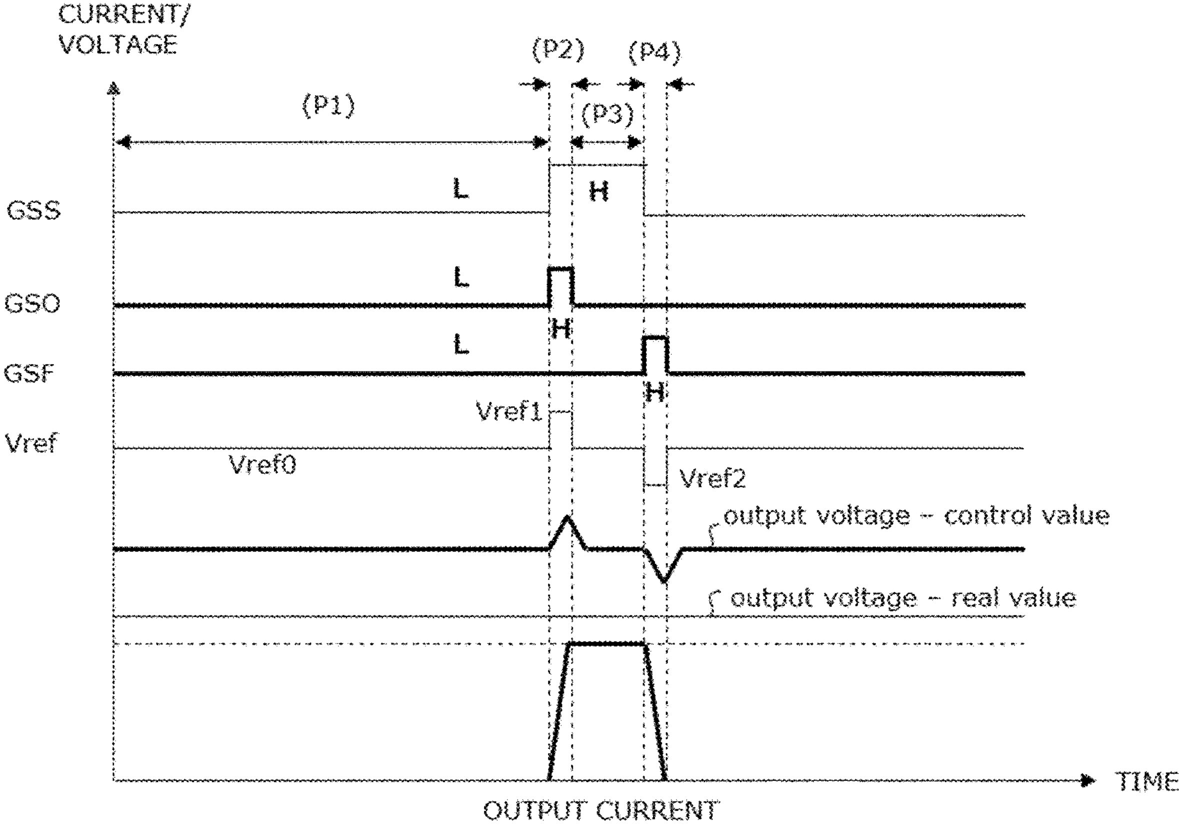
Figure 23:
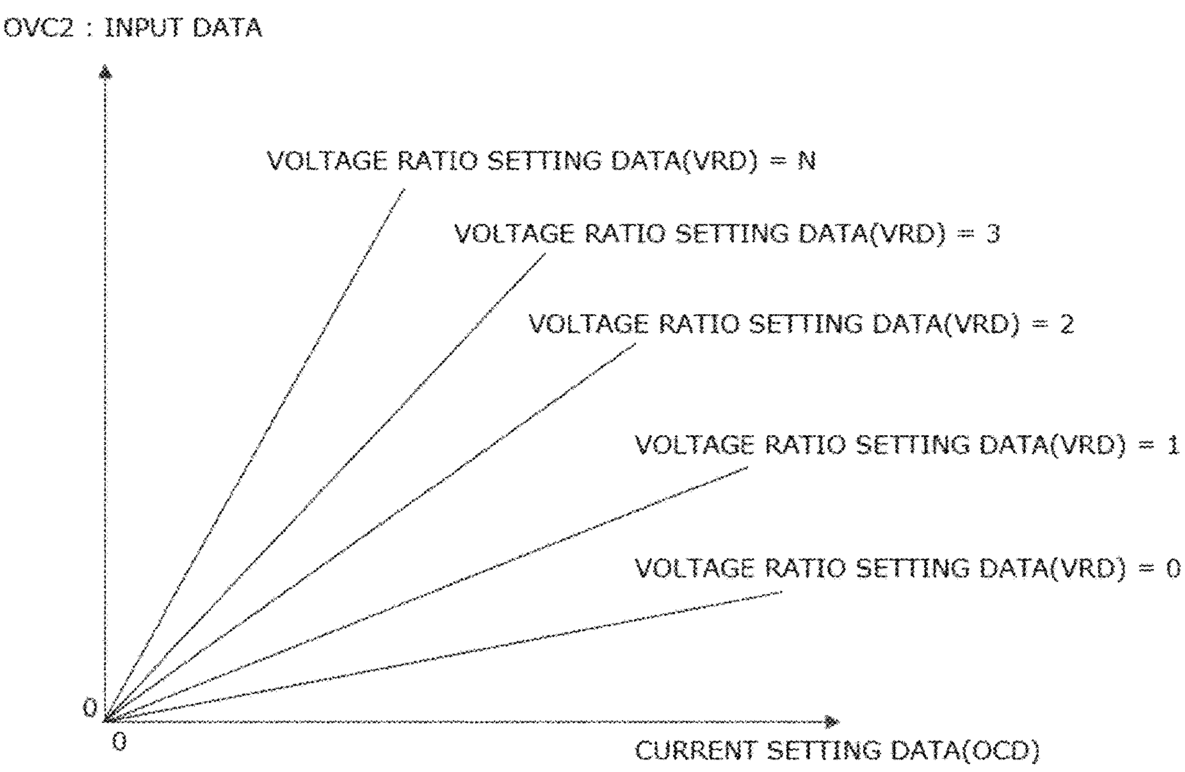
FIGS. 23 and 24 are graphs for describing a ratio setting circuit unit.
Figure 24:
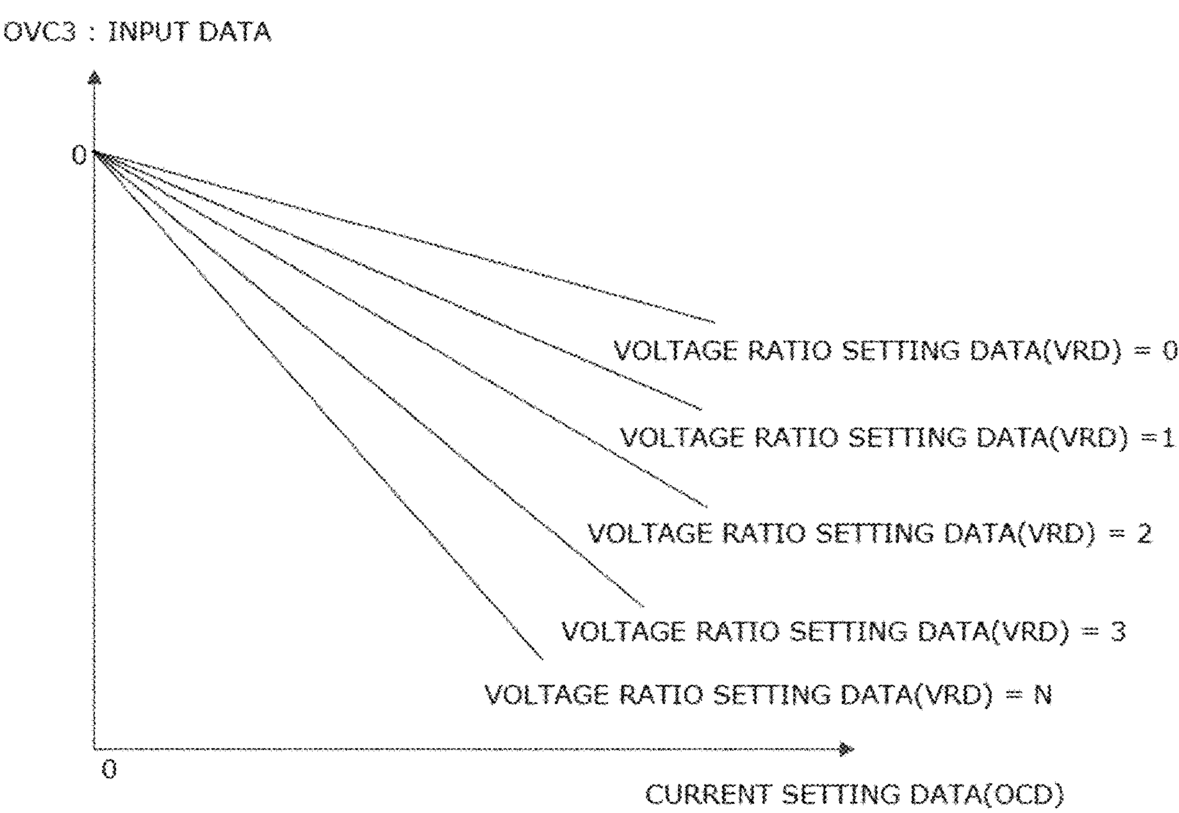

FIG. 18 is a block diagram schematically illustrating some elements of a light emitting display apparatus according to a third embodiment of the present disclosure, FIG. 19 is a block diagram illustrating in more detail a configuration of a power supply according to the third embodiment, FIG. 20 is an output waveform diagram for describing an output control concept of the power supply according to the third embodiment, FIGS. 21 and 22 are diagrams for describing an operation of a partial period when performing an operation of the power supply according to the third embodiment, and FIGS. 23 and 24 are graphs for describing a ratio setting circuit unit.

Referring to FIG. 18, the light emitting display apparatus according to the third embodiment can include a display panel 150, a power supply 180, and a timing controller 120.

The timing controller 120 can output a global shutter signal GSS, global shutter on/off time setting data GST, voltage setting data OVD, current setting data OCD, and voltage ratio setting data VRD so as to control the power supply 180. The timing controller 120 can transfer the global shutter signal GSS, the global shutter on/off time setting data GST, the voltage setting data OVD, the current setting data OCD, and the voltage ratio setting data VRD, based on a communication interface connected to the power supply 180. For example, the communication interface connected between the timing controller 120 and the power supply 180 can be I2C, SPI, or S-Wire, but is not limited thereto.

According to the third embodiment, the output controller 185 included in the power supply 180 can vary a generating condition of a first control signal and a second control signal, based on the global shutter signal GSS, the global shutter on/off time setting data GST, the voltage setting data OVD, the current setting data OCD, and the voltage ratio setting data VRD supplied from the timing controller 120 and a sensing value VSEN.

Referring to FIG. 19, the power supply 180 according to the third embodiment can include an output circuit unit 183 which generates a high-level voltage, based on an input power VIN, and an output controller 185 which controls an operation of the output circuit unit 183, as in the descriptions of the first embodiment and the second embodiment. The power supply 180 according to the third embodiment can have a difference with the second embodiment in configuration of the output controller 185, and thus, the difference will be described in more detail.

The output controller 185 can include a reference voltage setting circuit unit OVC1, a first compensation voltage setting circuit unit OVC2, a second compensation voltage setting circuit unit OVC3, a ratio setting circuit unit VRC, a first selection circuit unit SEL1, a second selection circuit unit SEL2, an edge detection circuit unit EDC, a voltage sensing circuit unit ERA, R1, and R2, and a control signal generator PWMC.

The reference voltage setting circuit unit OVC1 can output a reference voltage value Vref0, based on voltage setting data OVD. A level of the reference voltage value Vref0 can vary based on the voltage setting data OVD.

The first compensation voltage setting circuit unit OVC2 can output a first compensation voltage value Vref1, based on first data output from the ratio setting circuit unit VRC. A level of the first compensation voltage value Vref1 can vary based on the first data output from the ratio setting circuit unit VRC.

The second compensation voltage setting circuit unit OVC3 can output a second compensation voltage value Vref2, based on second data output from the ratio setting circuit unit VRC. A level of the second compensation voltage value Vref2 can vary based on the second data output from the ratio setting circuit unit VRC.

The ratio setting circuit unit VRC can output the first data and the second data which are to be supplied to the first compensation voltage setting circuit unit OVC2 and the second compensation voltage setting circuit unit OVC3, based on current setting data OCD and voltage ratio setting data VRD. The first data can differ from the second data. A description associated with the ratio setting circuit unit VRC will be given below.

The edge detection circuit unit EDC can generate a global shutter on signal GSO and a global shutter off signal GSF, based on the global shutter signal GSS and the global shutter on/off time setting data GST. A description associated with the edge detection circuit unit EDC will be given below.

The first selection circuit unit SEL1 can output the reference voltage value Vref0 or can output the first compensation voltage value Vref1, in response to the global shutter on signal GSO output from the edge detection circuit unit EDC. The first selection circuit unit SEL1 can supply one of the reference voltage value Vref0 and the first compensation voltage value Vref1 to the second selection circuit unit SEL2.

The second selection circuit unit SEL2 can output one of the reference voltage value Vref0 and the first compensation voltage value Vref1 supplied from the first selection circuit unit SEL1 or can output the second compensation voltage value Vref2, in response to the global shutter off signal GSF output from the edge detection circuit unit EDC. The second selection circuit unit SEL2 can supply one of the reference voltage value Vref0, the first compensation voltage value Vref1, and the second compensation voltage value Vref2 to the voltage sensing circuit unit ERA, R1, and R2.

The voltage sensing circuit unit ERA, R1, and R2 can sense a high-level voltage output from the output terminal of the output circuit unit 183 to obtain a sensing value VSEN. The voltage sensing circuit unit ERA, R1, and R2 can output a signal for controlling the control signal generator PWMC, based on the sensing value VSEN and a voltage value Vref output from the second selection circuit unit SEL2.

The voltage sensing circuit unit ERA, R1, and R2 can include an error amplifier ERA, a first resistor R1, and a second resistor R2. The first resistor R1 can be connected to the output terminal of the output circuit unit 183 at one end thereof, and the other end thereof can be connected to an inverting terminal (−) of the error amplifier ERA and one end of the second resistor R2. The second resistor R2 can be connected to the inverting terminal (−) of the error amplifier ERA and the other end of the first resistor R1 at the one end thereof, and the other end thereof can be connected to a ground terminal. The inverting terminal (−) of the error amplifier ERA can be connected to a node connected to the first resistor R1 and the second resistor R2, and a noninverting terminal (+) thereof can be connected to an output terminal of the second selection circuit unit SEL2.

The control signal generator PWMC can generate a first control signal and a second control signal for controlling a first transistor M1 and a second transistor M2 included in the output circuit unit 183, based on a signal output from the error amplifier ERA. The control signal generator PWMC can vary a generating condition of the first control signal and the second control signal, based on the signal output from the error amplifier ERA. The first control signal and the second control signal generated by the control signal generator PWMC can be output through a first control line MC1 and a second control line MC2.

Referring to FIGS. 19 and 20, in the power supply 180 according to the third embodiment, a voltage value Vref applied to the noninverting terminal (+) of the error amplifier ERA can be changed based on a period where an output current is not generated, an on period where the output current starts to generate, and an off period where the generating of the output current ends. This will be described below.

The edge detection circuit unit EDC can extract a logic low L time and a logic high H time in the global shutter signal GSS, based on time information included in the global shutter on/off time setting data GST. Also, based thereon, the edge detection circuit unit EDC can generate the global shutter on signal GSO and the global shutter off signal GSF and can generate a logic low L time and a logic high H time of the global shutter on signal GSO and a logic low L time and a logic high H time of the global shutter off signal GSF. Also, based thereon, the edge detection circuit unit EDC can output the global shutter on signal GSO and the global shutter off signal GSF.

When the global shutter on signal GSO and the global shutter off signal GSF are in a logic low L state, the reference voltage value Vref0 can be applied to the noninverting terminal (+) of the error amplifier ERA. When the global shutter on signal GSO is in a logic high H state and the global shutter off signal GSF is in a logic low L state, the first compensation voltage value Vref1 can be applied to the noninverting terminal (+) of the error amplifier ERA. When the global shutter on signal GSO is in a logic low L state and the global shutter off signal GSF is in a logic high H state, the second compensation voltage value Vref2 can be applied to the noninverting terminal (+) of the error amplifier ERA.

Referring to FIGS. 21 and 22, the reference voltage setting circuit unit OVC1, the first compensation voltage setting circuit unit OVC2, and the second compensation voltage setting circuit unit OVC3 can respectively include a first digital-to-analog converter DAC1, a second digital-to-analog converter DAC2, and a third digital-to-analog converter DAC3. Also, the first selection circuit unit SEL1 and the second selection circuit unit SEL2 can respectively include a first multiplexer MUX1 and a second multiplexer MUX2 each having the form of 2:1. Also, the ratio setting circuit unit VRC can include a multiplier MULT. However, FIG. 21 can be merely one embodiment, but the present disclosure is not limited thereto.

When the global shutter on signal GSO is applied in a logic low L state, the first selection circuit unit SEL1 can output the reference voltage value Vref0, and when the global shutter on signal GSO is applied in a logic high H state, the first selection circuit unit SEL1 can output the first compensation voltage value Vref1. When the global shutter off signal GSF is applied in a logic low L state, the second selection circuit unit SEL2 can output the reference voltage value Vref0 or the first compensation voltage value Vref1, and when the global shutter off signal GSF is applied in a logic high H state, the first selection circuit unit SEL1 can output the second compensation voltage value Vref2.

In FIG. 22, a first period P1 can be defined as a period where an output current is not generated. A second period P2 can be defined as an on period where the output current starts to generate. A third period P3 can be defined as a maintenance period of the third period P3. A fourth period P4 can be defined as an off period where the generating of the output current ends.

Referring to FIGS. 18 to 22, the power supply 180 according to the third embodiment can output the first compensation voltage value Vref1 and the second compensation voltage value Vref2 for offsetting output voltage ripple as in "output voltage-control value", when generating an output current. As a result, the power supply 180 according to the third embodiment can generate an output voltage which is improved so that output voltage ripple is hardly seen, as in "output voltage-real value".

Referring to FIG. 21, the ratio setting circuit unit VRC can provide first data and second data which are respectively supplied to the first compensation voltage setting circuit unit OVC2 and the second compensation voltage setting circuit unit OVC3, based on the current setting data OCD and the voltage ratio setting data VRD. The first data and the second data can be associated with a compensation value for compensating for output voltage ripple.

The ratio setting circuit unit VRC can include a first ratio setting circuit block providing the first data (OVC2 input data) which is to be input to the first compensation voltage setting circuit unit OVC2 as in FIG. 23 and a second ratio setting circuit block providing the second data (OVC3 input data) which is to be input to the second compensation voltage setting circuit unit OVC3 as in FIG. 24.

Referring to the first ratio setting circuit block of FIG. 23 and the second ratio setting circuit block of FIG. 24, the elements can include voltage ratio setting data VRD provided differently. Accordingly, the first ratio setting circuit block and the second ratio setting circuit block can provide data having different values as in a difference between 0 to N values even when the current setting data OCD and the voltage ratio setting data VRD are input as the same value.

Furthermore, in FIGS. 23 and 24, an example where the voltage ratio setting data VRD is provided as a rectilinear graph type can be described, but this can be provided as a curve graph type. Also, an interval between the voltage ratio setting data VRD can be constant or may not be constant. Accordingly, the first ratio setting circuit block of FIG. 23 and the second ratio setting circuit block of FIG. 24 can be merely described for helping understanding, and it should be construed to be set (adjusted) based on an output of the power supply and a load transient condition of the display panel.

Hereinabove, the present disclosure can remove or decrease (e.g., improve) an output voltage ripple caused by the occurrence of a load transient condition in driving of a display panel. Also, in the present disclosure, an output of a current can immediately occur during an image expression period after an output of a current is disconnected during a grayscale conversion period when expressing a moving image, thereby preventing (e.g., minimizing) a possibility of a motion afterimage. Also, the present disclosure can remove or improve output voltage ripple caused by the occurrence of the load transient condition in driving of the display panel, based on a global shutter driving mode, and thus, can enhance the display quality of a moving image.

The effects according to the present disclosure are not limited to the above examples, and other various effects can be included in the specification.

While the present disclosure has been particularly shown and described with reference to example embodiments thereof, it will be understood by those of ordinary skill in the art that various changes in form and details can be made therein without departing from the spirit and scope of the present disclosure as defined by the following claims.

What is claimed is:

1. A display apparatus comprising:

a display panel configured to display an image;

a timing controller configured to control the display panel; and a power supply including an output circuit and an output controller, the output circuit configured to generate an output power for supplying power to the display panel based on an input power, and the output controller configured to sense a voltage output through an output terminal of the output circuit to obtain a sensing value, wherein the output controller provides a reference voltage value and compensation voltage values having levels which differ from a level of the reference voltage value, based on an external signal, selectively outputs at least one of the reference voltage value and the compensation voltage values to provide a voltage value, based on the external signal, and generates a control signal for controlling the output circuit, based on a comparison between the sensing value and the voltage value.

2. The display apparatus of claim 1, wherein the output controller offsets an output voltage ripple appearing in an output terminal thereof when an output current is generated from the output circuit, based on the compensation voltage values.

3. The display apparatus of claim 1, wherein the output controller comprises:

a reference voltage setting circuit configured to output the reference voltage value, based on voltage setting data included in the external signal; and a first compensation voltage setting circuit and a second compensation voltage setting circuit configured to respectively output a first compensation voltage value and a second compensation voltage value, based on current setting data included in the external signal.

4. The display apparatus of claim 3, wherein the reference voltage value, the first compensation voltage value, and the second compensation voltage value have a following relationship:

the second compensation voltage value<the reference voltage value<the first compensation voltage value.

5. The display apparatus of claim 4, wherein the reference voltage setting circuit outputs the reference voltage value having a level which increases as a voltage setting data value included in the voltage setting data increases, the first compensation voltage setting circuit outputs the first compensation voltage value having a level which increases as a current setting data value included in the current setting data increases, and the second compensation voltage setting circuit outputs the second compensation voltage value having a level which decreases as a current setting data value included in the current setting data increases.

6. The display apparatus of claim 5, wherein the output controller comprises a selection circuit configured receive the reference voltage value, the first compensation voltage value, and the second compensation voltage value, and to selectively output one of the reference voltage value, the first compensation voltage value, and the second compensation voltage value, based on a logic state of each of a global shutter on signal and a global shutter off signal.

7. The display apparatus of claim 6, wherein the global shutter on signal and the global shutter off signal are included in the external signal.

8. The display apparatus of claim 6, wherein the output controller further comprises an edge detection circuit configured to generate the global shutter on signal and the global shutter off signal, based on global shutter signal and global shutter on/off time setting data included in the external signal.

9. The display apparatus of claim 4, wherein the first compensation voltage value and the second compensation voltage value have a reverse phase relationship.

10. The display apparatus of claim 6, wherein the selection circuit outputs the reference voltage value during a first period where a load transient caused by driving of the display panel does not occur, outputs the first compensation voltage value during a second period where a load transient caused by driving of the display panel starts, outputs the reference voltage value during a third period where driving of the display panel is maintained, and outputs the second compensation voltage value during a fourth period where a load transient caused by driving of the display panel ends.

11. The display apparatus of claim 3, wherein the output controller further comprises a ratio setting circuit configured to provide first data and second data which are respectively supplied to the first compensation voltage setting circuit and the second compensation voltage setting circuit, based on current setting data and voltage ratio setting data included in the external signal, wherein the first compensation voltage setting circuit and the second compensation voltage setting circuit output the first compensation voltage value and the second compensation voltage value based on the first data and the second data respectively.

12. A power supply comprising:

an output circuit configured to generate an output power, based on an input power; and an output controller configured to sense a voltage output through an output terminal of the output circuit to obtain a sensing value, wherein the output controller provides a reference voltage value and compensation voltage values having levels which differ from a level of the reference voltage value, based on an external signal, selectively outputs at least one of the reference voltage value and the compensation voltage values to provide a voltage value, based on the external signal, and generates a control signal for controlling the output circuit, based on a comparison between the sensing value and the voltage value.

13. The power supply of claim 12, wherein the output controller comprises:

a reference voltage setting circuit configured to output the reference voltage value, based on voltage setting data included in the external signal; and a first compensation voltage setting circuit and a second compensation voltage setting circuit configured to respectively output a first compensation voltage value and a second compensation voltage value, based on current setting data included in the external signal, and wherein the reference voltage value, the first compensation voltage value, and the second compensation voltage value have a following relationship:

the second compensation voltage value<the reference voltage value<the first compensation voltage value.

14. The power supply of claim 13, wherein the reference voltage setting circuit outputs the reference voltage value having a level which increases as a voltage setting data value included in the voltage setting data increases, the first compensation voltage setting circuit outputs the first compensation voltage value having a level which increases as a current setting data value included in the current setting data increases, and the second compensation voltage setting circuit outputs the second compensation voltage value having a level which decreases as a current setting data value included in the current setting data increases.

15. The power supply of claim 14, wherein the output controller comprises a selection circuit configured to receive the reference voltage value, the first compensation voltage value, and the second compensation voltage value, and selectively output one of the reference voltage value, the first compensation voltage value, and the second compensation voltage value, based on a logic state of each of an on signal and an off signal included in the external signal.

16. The power supply of claim 15, wherein the on signal and the off signal are included in the external signal.

17. The power supply of claim 15, wherein the output controller further comprises an edge detection circuit configured to generate the on signal and the off signal, based on global shutter signal and global shutter on/off time setting data included in the external signal.

18. The power supply of claim 15, wherein the selection circuit outputs the reference voltage value during a first period where an output current is not generated from the output circuit, outputs the first compensation voltage value during a second period where the output current starts to generate, outputs the reference voltage value during a third period where the output current is maintained, and outputs the second compensation voltage value during a fourth period where the generating of the output current ends.

19. The power supply of claim 13, wherein the output controller further comprises a ratio setting circuit configured to provide first data and second data which are respectively supplied to the first compensation voltage setting circuit and the second compensation voltage setting circuit, based on current setting data and voltage ratio setting data included in the external signal, wherein the first compensation voltage setting circuit and the second compensation voltage setting circuit output the first compensation voltage value and the second compensation voltage value based on the first data and the second data respectively.

* * * * *